United States Patent [19]

Goupil

[11] 4,284,650
[45] Aug. 18, 1981

[54] COMPOSITION FOR CHEWING GUMS

[76] Inventor: Jean-Jacques Goupil, 30 Avenue du Président Wilson, 94230 Cachan, France

[21] Appl. No.: 75,090

[22] Filed: Sep. 13, 1979

Related U.S. Application Data

[63] Continuation of Ser. No. 893,783, Apr. 5, 1978.

[51] Int. Cl.$^3$ .............................................. A23G 3/30
[52] U.S. Cl. ...................................... 426/5; 426/548; 426/658; 426/804; 424/49
[58] Field of Search ........................................ 426/3-6, 426/658, 548; 424/49

[56] References Cited

U.S. PATENT DOCUMENTS

| | | | |
|---|---|---|---|
| 2,627,493 | 2/1953 | Merckel | 426/3 |
| 2,700,012 | 1/1955 | Merckel | 426/3 |
| 4,064,274 | 12/1977 | Mackay et al. | 426/3 |

Primary Examiner—Jeanette M. Hunter
Attorney, Agent, or Firm—Darby & Darby

[57] ABSTRACT

A composition for chewing gum, which contains a gum base free of any alkaline-earths, a fluorine-containing salt soluble in water and xylitol mixed with sorbose or sorbitol.

5 Claims, No Drawings

COMPOSITION FOR CHEWING GUMS

This is a continuation of application Ser. No. 893,783 filed Apr. 5, 1978.

The present invention relates to a manufacturing process for a chewing gum and to the resulting compositions.

Fluorine, which is indispensable for the mineral edification of the tooth via the internal route in a pre-eruptive phase is none the less indispensable for its protection by the topic route as early as the post-eruptive phase, by reinforcing the enamel and make it less vulnerable to the aggressivity of the cariogenic acids which it contributes to inhibit or to slow the production by direct action on the bacterial enzymes and the microbial bodies of the dental plaque.

The cariostatic action of fluorine is now largely demonstrated and admitted, be it for the ingestion (internal route) or local application (topic route). This action is exerted on the tooth through a crystalline chemical action and on the saliva and the dental plaque by a bio-chemical action.

Fluorine acts on the tooth in a pre-eruptive phase or a post-eruptive phase by reinforcing its mineral structure:

(a) by formation of Fluor-apatite,
(b) by reinforcing the "crystallinity" of the calcium phosphates and their precipitation in the most stable form: the Hydroxy-apatite.

This action results for the enamel in:

a greater resistance to outer agents, consecutive to a better mineral edification,
less solubility in the cariogenic acids.

On the other hand, fluorine, due to its anti-enzymatic properties acts by blocking or by reducing the saliva enzymes and, by way of consequence, by inhibiting or limiting the formation of cariogenic acids of high aggressivity for the enamel.

The dental plaque or bacterial plaque is the deposit which forms at the basis of the teeth adjacent the gums which, in spite of a daily hygiene, is very quickly reformed between two brushings. This sticky coating is formed of modified saliva proteins which become insoluble, or mucopolysaccharides and uncountable microbial bodies.

So, due to its accumulation in the plaque, fluorine is present, as has been recently demonstrated, at 95% under a combined form (in particular inside the microbial bodies) and not ionized, can fully play its role of enzyme inhibitor and prevent the formation of cariogenic acids.

A further feature of the plaque against which the fluorine acts is its faculty to synthetize, through the action of the bacterial enzymes (glucosyltransferases—fructosyltransferases), reserve polysaccharides from ingested sugars, glucose or dextrose (dextran), levulose (levan), both being originating from the glucidic hydrolysis of saccharose, recognized as being the most cariogenic sugar (under certain conditions of use: division and repetition of intakes, sticky sweets, evening sweets ...).

This capacity of the enzymes to form reserves, which are thereafter progressively degraded, results in maintaining a local acidity the prolongated action of which results in a progressive dissolution of the enamel mineral salts (pH 5,5).

Fluorine prevents the synthesis of such polysaccharides at concentrations of 10 ppm.

Moreover, the growth and metabolism of the acidogenic germs of the dental plaque are very strongly inhibited by fluorine used locally. This action has been known for a long time and has to be added to what has been said about its anti-enzymatic action.

This bacteriostatic action requires local concentrations of fluorine of the order of 10 to 20 ppm.

As a conclusion, the bio-chemical activity of fluorine is carried out, in post-eruptive phase, directly and locally on the saliva and the dental plaque due to its properties:

(a) anti-enzymatic
(b) bacteriostatic, and this due to its accumulation capacity in the plaque where it may reach efficient rates, particularly by concentrating in the microbial bodies themselves.

This double feature results in an important reduction, and even an inhibition, of the local cariogenic acidity.

The various means for using fluorine are via the internal route and the local route.

It has been demonstrated that for an equal concentration of fluorine, a sweet tablet before being swallowed had an efficiency substantially greater than the same tablet directly swallowed.

This result is explained by the fact that in the first case the fluorine concentrating in the saliva may, due to its affinity for the mineral salts of the enamel and the dental plaque, quicky fix on the latter and protect the tooth through a local action quicker and better than by the internal route only.

This dispensing mode offers therefore the advantage of associating both cario-preventive action possibilities of fluorine: the internal route and the topic route, the latter appearing now to be as important, and even more, than the general route as early as the post-eruptive phase.

In this spirit, it has been thought quite naturally to use carriers allowing maintaining in the mouth a prolongated contact of the active element before swallowing. The chewing gum has proved to be—in particular for the child and the adolescent—the ideal support for this type of fluorine dispensation. In fact, it provides in a simple and pleasant way, through the mechanical action of mastication, an easy penetration by direct contact of the fluorine in the enamel.

But, whereas the aim is the prevention of dental decay, the usual composition of any chewing gum is based on glucides (saccharose—glucose ... ) which are strongly cariogenic.

There is therefore a fundamental anomaly which has led to conceive a rational formula capable of being anti-cariogenic by its active principle: the fluorine, and acariogenic by its excipient.

The object of the invention is therefore double:

(a) the incorporation, at a convenient dose, of fluorine, which is the cariostatic principle in the chewing gum.
(b) the replacement of the usual cariogenic constituents of said gum by products having the same sweetening properties and, in particular, a sweetening power free from cariogenicity.

The choice has been made from three natural sweetening substances of edulcorators:

the XYLITOL: of formula $C_5 H_{12} O_5$ (molecular weight 152,15), a pentitol derived from Xylose, a sugar existing in many fruits, cereals, vegetables.

the L-SORBOSE: of formula C6 H12 O6 (molecular weight 180), a cetohexose existing in the natural state in sorb berries.

the D-SORBITOL: of formula C6 H14 O6 (molecular weight 182) existing naturally in numerous berries.

These saccharose substituents have fundamental differences to the glucides habitually used for the manufacture of chewing gums, as well as regards their biological behaviour relative to the saliva and dental plaque enzymes as cariogenic micro-organisms of the oral cavity—streptococcus mutans, mitis, salivarius, lactis, sanguisactynomyces viscosus, etc. . resulting in that neither the Xylitol, the Sorbose nor the Sorbitol are used or fermented by said bacterial agents and their enzymes.

As it is known that the latter are indispensable for building the dental plaque, for its growth and its metabolic activities responsible of the decay process from a bio-chemical point of view, in particular by the enzymatic degradation of the glucides and the sweet reserves of food origin leading to the production of cariogenic acids highly de-mineralizing for the enamel, one can only stress the obvious interest of such a formula associating Xylitol, Sorbose or Sorbitol, instead of sugar (saccharose) and glucose which are currently used.

According to the invention, the process for preparing a composition for chewing gum is characterized in that the only sweetening constituents which are introduced are the Xylitol and the L-Sorbose, or the Xylitol and the D-Sorbitol, and that a component containing ionized fluorine in the form of fluorine soluble in water at a convenient dose is incorporated therein, the gum base being free of any alkaline-earths in order to avoid precipitation of the fluorine ion in the state of an insoluble salt, and therefore inactive. Apart from the process, what is claimed as being part of the invention are the compositions for the chewing gums produced by means of the hereabove described process.

It is obvious that any formulation component for a chewing gum according to the invention has to be free from elements or chemical components capable of producing insoluble fluorides. The most important representatives of said elements are the alkaline-earths, that is mainly the calcium ion.

There are now given, as examples, a few formulas according to the invention:

|  | A | B | C | D |
|---|---|---|---|---|
| Na fluoride | 0,007143 g | 0,01000 g | 0.01580 g | 0.02212 g |
| Gum base | 20,0 g | 30.0 g | 20.0 g | 30.0 g |
| Xylitol | 10.0 g | 53.0 g | 68.0 g | 10.0 g |
| L-Sorbose | 68.0 g | 10.0 g | 10.0 g | 53.0 g |
| Paraffin oil | 0.1 g | 0.5 g | 0.1 g | 5.0 g |
| Glycerin | 1.0 g | 5.0 g | 100 g | 5.0 g |
| Aroma | qs | qs | qs | qs |

Formulas A and B correspond to an intake in the tablet form of:
Sodium fluorine: 0.250 mg (that is 0.113 mg F−)
Formula A: tablet of 3.50 g
Formula B: tablet of 2.50 g Formulas C and D correspond to an intake in the tablet form of:
Sodium fluorine: 0.553 mg (that is 0.250 mg F−)
Formula C: tablet of 3.50 g
Formula D: tablet of 2.50 g

|  | E | F | G |
|---|---|---|---|
| Na fluoride | 0.000250 g | 0.000250 g | 0.000553 g |
| Xylitol | 0.170 g | 0.867 g | 1.530 g |
| Sorbitol | 1.530 g | 0.833 g | 0.170 g |
| Aromatized gum base | qsp 2.50 g | qsp 2.50 g | qsp 2.50 g |

Example of a preparation process according to the invention.

In a Werner type mixer, in a water bath heated to a temperature which does not exceed 65° C., there is introduced, under slow mixing, the gum base previously divided. When the latter is sufficiently softened and homogenous, paraffin oil or glycerin, or both, are added, and a part of Sorbose, or of Sorbitol, previously sifted. One waits a few minutes so that the mixture is correct, the heating is stopped and the remaining of the powders, Sorbitol or Sorbose and Xylitol, also sifted, is progressively incorporated as well as the sodium fluoride.

The perfume is then added at the end of the operation together with a sufficient quantity of Sorbose or Sorbitol set aside. The mixture is stirred until complete homogeneity.

The paste is then treated to be transformed into tablets and packed.

The Xylitol and Sorbose contents, or the Xylitol and Sorbitol contents of the compositions for chewing gums of the present invention varies between 45% and 90% by weight.

The weight ratio between the Xylitol on the one hand and the Sorbose or the Sorbitol on the other hand is comprised between 1:10 and 10:1.

The concentration in fluorine per tablet, whatever its final weight, that is by unit of intake, may vary but within the fixed limits of 0.250 mg to 0.553 mg for the sodium fluoride, that is 0.113 mg to 0.250 mg for the fluorine element. On the other hand, the proportion of Xylitol and Sorbose, or of Xylitol and Sorbitol may vary, as a function of the final weight of the tablet and the composition of the excipient, within wide limits which may be for instance of 0.250 to 0.40 g.

What we claim is:

1. A chewing gum composition in the form of a tablet, said tablet consisting essentially of an aromatized alkaline earth-free gum base, sodium fluoride, and a water soluble artificial sweetener consisting essentially of xylitol mixed with L-sorbose of the formula $C_6H_{12}O_6$, said artificial sweetener comprising between about 45% and about 90% by weight of the composition, and the weight ratio of said xylitol to said sorbose is between about 1:10 and about 10:1 and said composition being free of alkaline earth constituents capable of forming insoluble fluoride compounds.

2. A chewing gum in the form of a tablet, said tablet consisting essentially of an aromatized alkaline earth-free gum base, sodium fluoride, and artificial sweetener consisting essentially of a xylitol and sorbitol mixture, said artificial sweetener comprising between about 45% and about 90% by weight of the tablet, and the weight ratio of said xylitol to said sorbitol is between about 1:10 and 10:1.

3. A process for the preparation of a chewing gum composition, which comprises heating a gum base free of any alkaline earth to about 65° C., slowly mixing said gum base and incorporating sodium fluoride, xylitol and L-sorbose into said gum base together with a member selected from the group consisting of liquid paraffin and glycerin, the weight ratio of said xylitol to said sorbose being between about 1:10 and about 10:1.

4. A process for the preparation of a chewing gum composition, which comprises heating a gum base free of any alkaline earths to about 65° C., slowly mixing said gum base and incorporating sodium fluoride, xylitol and sorbitol into said gum base, the weight ratio of said xylitol to said sorbitol being between about 1:10 and about 10:1.

5. A chewing gum in the form of a tablet, said tablet comprising 0.000250 grams of sodium fluoride, 0.867 grams of xylitol, 0.833 grams of sorbitol and a sufficient quantity of an aromatized gum base to make a tablet having a total weight of 2.5 grams, said gum base being free of any alkaline earths capable of forming insoluble fluoride compounds.

* * * * *